United States Patent
Wu et al.

(10) Patent No.: US 8,717,439 B2
(45) Date of Patent: May 6, 2014

(54) SURVEILLANCE SYSTEM AND METHOD

(75) Inventors: Kang Wu, Shenzhen (CN); Bo Tian, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 436 days.

(21) Appl. No.: 13/077,997

(22) Filed: Apr. 1, 2011

(65) Prior Publication Data
US 2012/0075468 A1 Mar. 29, 2012

(30) Foreign Application Priority Data
Sep. 24, 2010 (CN) .......................... 2010 1 0289457

(51) Int. Cl.
*H04N 7/18* (2006.01)
(52) U.S. Cl.
USPC .......................................... 348/154; 348/143
(58) Field of Classification Search
CPC .............................. G08B 13/196; H04N 5/144
USPC ................................................. 348/143, 154
See application file for complete search history.

(56) References Cited

U.S. PATENT DOCUMENTS

2006/0238618 A1* 10/2006 Wren et al. .................... 348/155
2006/0279628 A1* 12/2006 Fleming ........................ 348/143

* cited by examiner

*Primary Examiner* — Sath V Perungavoor
*Assistant Examiner* — Jeffery Williams
(74) *Attorney, Agent, or Firm* — Novak Druce Connolly Bove + Quigg LLP

(57) ABSTRACT

A surveillance method monitors a monitored area using a monitoring station. The monitoring station in electronic communication with an actuator, an image capture device, and a plurality of motion sensors. The presence of motion in the monitored area is detected in real-time using the motion sensors. When the motion is detected, a target region in the monitored area where the motion is detected is determined, and a control signal is sent to the actuator according to the target region to control the image capture device to aim at the target region using the actuator. Real-time images of the target region are captured, and stored in a storage system of the monitoring station.

9 Claims, 3 Drawing Sheets

SURVEILLANCE SYSTEM AND METHOD

BACKGROUND

1. Technical Field

Embodiments of the present disclosure relate generally to surveillance technologies, and more particularly, to a surveillance system and method.

2. Description of Related Art

Video surveillance systems are widely used in security systems to monitor areas requiring protection. However, it is common for such systems to have blind spots, such as below or behind a camera. In some cases, a plurality of cameras may be used to try to prevent blind spots but this is a costly solution. In other systems, a camera may be powered to constantly pan and tilt to eliminate blind spots, but this uses much power and is still subject to at least temporary blind spots.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
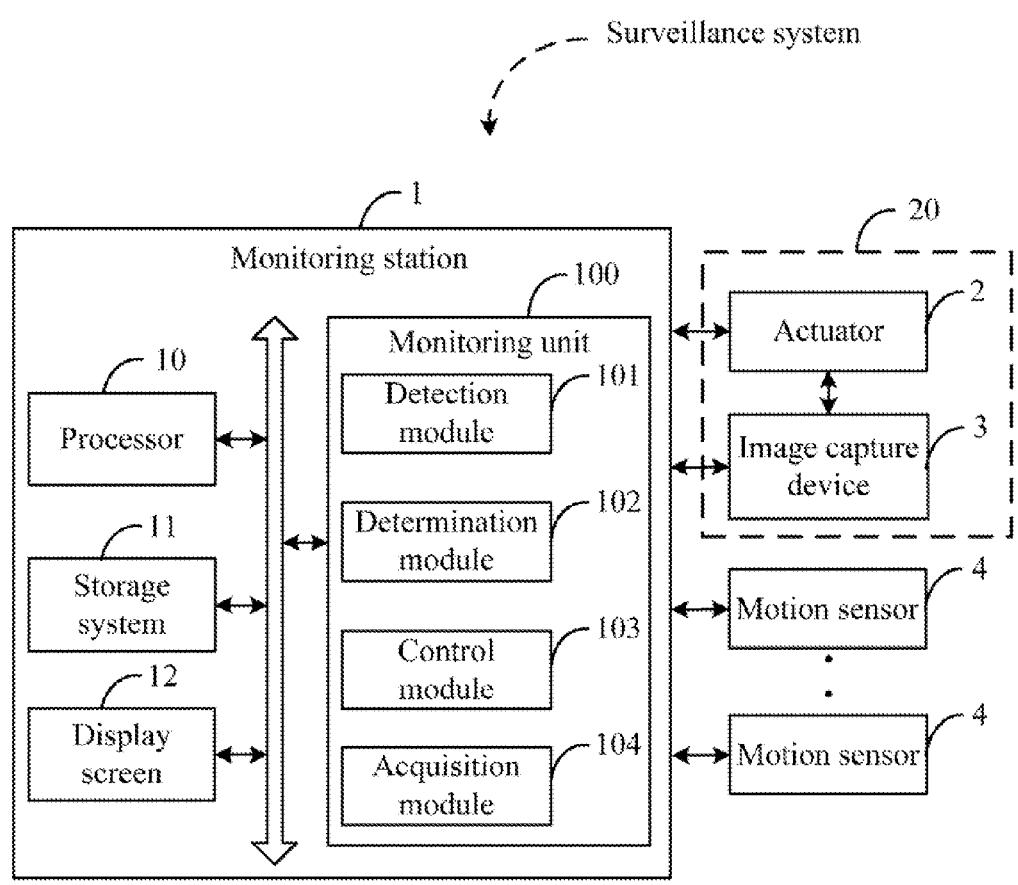
FIG. 1 is a block diagram of one embodiment of a surveillance system.

FIG. 1 is a block diagram of one embodiment of a surveillance system. The surveillance system includes a monitoring station 1, an actuator 2, an image capture device 3, and a plurality of motion sensors 4. In the embodiment, the monitoring station 1 includes a processor 10, a storage system 11, a display screen 12, and a monitoring unit 100. The monitoring unit 100 includes a detection module 101, a determination module 102, a control module 103, and an image capture module 104. Those modules may include one or more computerized instructions in the form of one or more programs that are stored in the storage system 11 or a computer-readable medium of the monitoring station 1, and executed by the processor 10 to perform operations of the monitoring station 1. In general, the word "module", as used herein, refers to logic embodied in hardware or firmware, or to a collection of software instructions, written in a programming language, such as, Java, C, or Assembly. One or more software instructions in the modules may be embedded in firmware, such as EPROM. The modules described herein may be implemented as either software and/or hardware modules and may be stored in any type of computer-readable medium or other storage device.

The monitoring station 1 electronically communicates with the actuator 2, the image capture device 3, and each of the motion sensors 4 through electrical or wireless connections. In the embodiment, the actuator 2 may be a servomotor. The image capture device 3 may be a charge coupled device (CCD) camera, a video camera, or a digital camera that can capture images of a monitored area even in low light conditions. In other embodiments, the actuator 2 and the image capture device 3 may constitute a pan/tilt/zoom (PTZ) camera 20 that can pan, tilt, and rotate under control of the monitoring station 1. When motion is detected in the monitored area, such as made by a human, an animal, or a car, the image capture device 3 may be driven by the actuator 2 to move and capture real-time images of the portion of the monitored area where the motion is detected. The monitoring station 1 may be a computer, a server, or other computing device used to monitor the monitored area in cooperation with the actuator 2, the image capture device 3, and the motion sensors 4. It should be apparent that FIG. 1 is only one example of the monitoring station 1 that can be included with more or fewer components than shown in other embodiments, or a different configuration of the various components.

The storage system 11 stores one or more programs, such as programs of an operating system, and other applications of the monitoring station 1. In one embodiment, the storage system 11 may be random access memory (RAM) for temporary storage of information, and/or a read only memory (ROM) for permanent storage of information. In other embodiments, the storage system 11 may also be an external storage device, such as a hard disk, a storage card, or a data storage medium. The processor 10 executes computerized operations of the monitoring unit 1 and other applications, to provide functions of the monitoring station 1.

Figure 2:
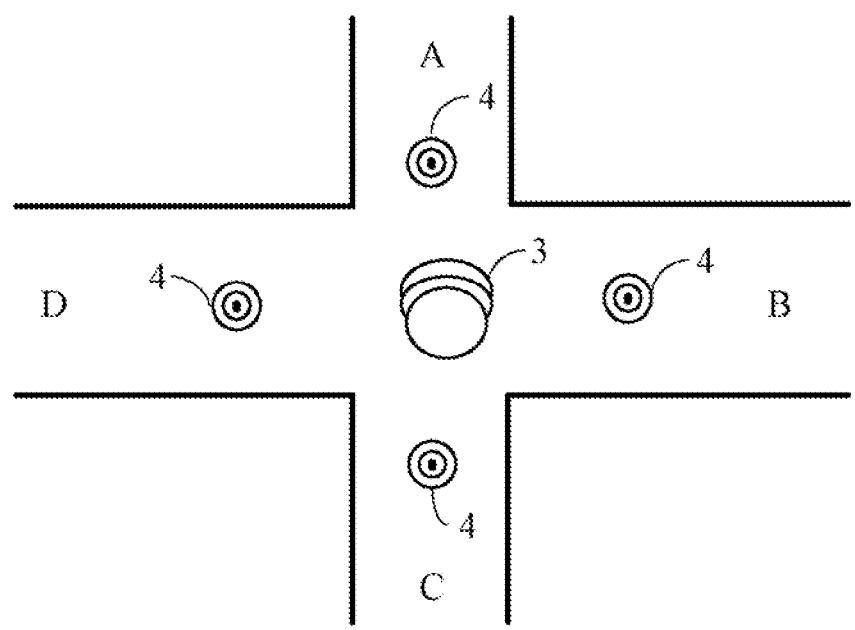
FIG. 2 is a schematic diagram illustrating one example of placement of an image capture device and four motion sensors of the surveillance system of FIG. 1 in an area to be monitored.

Each of the motion sensors 4 is located at a position that allows detection of motion in a target region of the monitored area. In one example, as shown in FIG. 2, the monitored area is divided into four target regions A, B, C, and D. The motion sensors 4 may be respectively located to cover each of the regions. In the embodiment, each of the motion sensors 4 may include one or more passive infrared (PIR) sensors, sound sensors, or dual-technology devices that comprise both a PIR sensor and a sound sensor.

The detection module 101 is operable to detect presence of motion in the monitored area in real-time using the motion sensors 4. In the embodiment, when one of the motion sensors 4 senses a moving object, for example, a person or a car entering the monitored area, the motion sensor 4 may send a trigger signal to the monitoring station 1 to inform the monitoring station 1 a moving object has been detected entering the monitored area.

The determination module 102 is operable to determine a target region in the monitored area where the motion is detected according to which of the motion sensors 4 detects the motion, when the motion is detected. In one embodiment, as shown in FIG. 2, the determination module 102 may determine in which target region A, B, C, D the motion is detected. For example, if the motion is detected by one of the motion sensors 4 that is located in the target region B, the determination module 102 determines that the motion is detected in the target region B.

The control module 103 is operable to send a control signal to the actuator 2 according to the target region where the motion is detected, to control the image capture device 3 to aim at the target region, such as the target region A, B, C, D, in which the motion is detected, using the actuator 2.

In one example, if the motion is detected by one of the motion sensors 4 covering the target region A, the control module 103 may send a control signal to the actuator 2 to control the image capture device 3 to pan, tilt, or rotate to orient onto the target region A, so as to capture real-time images of the target region A.

In the embodiment, the motion sensors 4 are prioritized according to predetermined importance of each motion sensor 4, so that when two or more of the motion sensors 4 simultaneously detect motion, the control module 103 preferentially controls the image capture device 3 to aim at a coverage region of the activated motion sensor 4 having the higher priority.

The image capture module 104 is operable to capture real-time images of the target region where the motion is detected using the image capture device 3, and store the captured images in the storage system 11. Additionally, if the monitored area needs to be viewed, the image capture module 104 further displays the captured images on the display screen 12.

Figure 3:
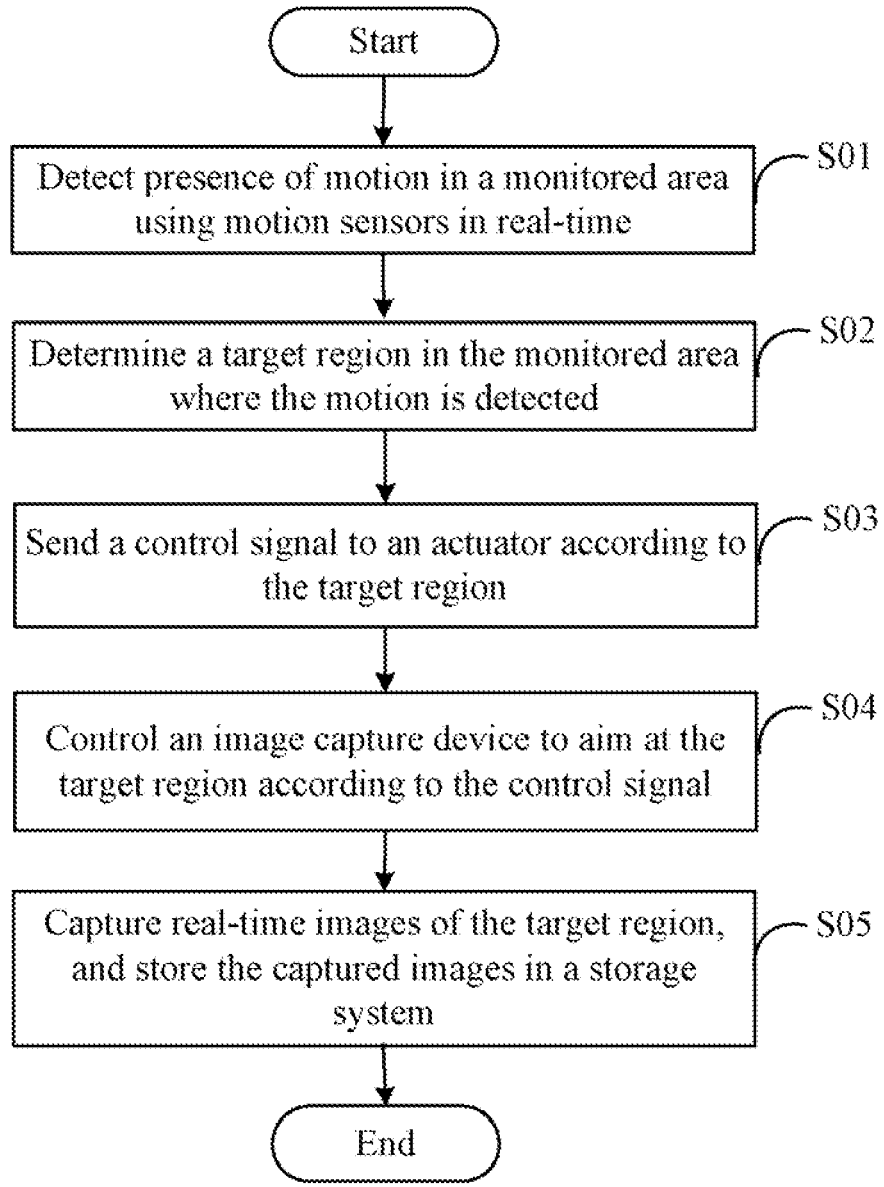
FIG. 3 is a flowchart of one embodiment of a surveillance method using the devices of FIG. 1.

FIG. 3 is a flowchart of one embodiment of a surveillance method using the surveillance system of FIG. 1. Depending on the embodiment, additional blocks may be added, others removed, and the ordering of the blocks may be changed.

In block S01, the detection module 101 detects presence of motion in a monitored area in real-time using the motion sensors 4.

When the motion is detected, in block S02, the determination module 102 determines a target region in the monitored area where the motion is detected according to which of the motion sensors 4 detects the motion.

In block S03, the control module 103 sends a control signal to the actuator 2 according to the target region where the motion is detected.

In block S04, the actuator 2 controls the image capture device 3 to aim at the target region according to the control signal. In one example, the image capture device 3 may be controlled to aim at the target region B of FIG. 2 when the motion is detected in the target region B. Additionally, the motion sensors 4 are prioritized according to predetermined importance of each motion sensor 4, so that when two or more of the motion sensors 4 simultaneously detect motion, the control module 103 preferentially controls the image capture device 3 to aim at a coverage region of the activated motion sensor 4 having the higher priority.

In block S05, the image capture module 104 captures real-time images of the target region using the image capture device 3, and store the captured images in the storage system 11. Additionally, if the monitored area needs to be viewed, the image capture module 104 further displays the captured images on the display screen 12.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A surveillance method using a monitoring station, the monitoring station electronically communicating with an actuator, an image capture device, and a plurality of motion sensors, the method comprising:
   detecting presence of motion in a monitored area in real-time using the motion sensors;
   determining a target region in the monitored area where the motion is detected according to which of the motion sensors detects the motion when the motion is detected, the motion sensors prioritized according to a predetermined importance of each motion sensor and each of the motion sensors being located to cover a target region in the monitored area; when two or more of the motion sensors simultaneously detect motion, the target region determined according to a covered target region of one of the two or more motion sensors having a higher priority;
   sending a control signal to the actuator according to the target region where the motion is detected;
   controlling the image capture device to aim at the target region using the actuator according to the control signal;
   capturing real-time images of the target region using the image capture device; and
   storing the captured images in a storage system of the monitoring station.

2. The method according to claim 1, further comprising:
   displaying the captured images on a display screen of the monitoring station.

3. The method according to claim 1, wherein each of the motion sensors includes one or more passive infrared (PIR) sensors, sound sensors, or dual-technology devices that comprise both a PIR sensor and a sound sensor.

4. A monitoring station in electronic communication with an actuator, an image capture device, and a plurality of motion sensors, the monitoring station comprising:
   a display screen;
   at least one processor;
   a storage system; and
   one or more programs stored in the storage system and being executable by the at least one processor, the one or more programs comprising:
   a detection module operable to detect presence of motion in a monitored area in real-time using the motion sensors;
   a determination module operable to determine a target region in the monitored area where the motion is detected according to which of the motion sensors detects the motion when the motion is detected, the motion sensors prioritized according to a predetermined importance of each motion sensor and each of the motion sensors being located to cover a target region in the monitored area; when two or more of the motion sensors simultaneously detect motion, the target region determined according to a covered target region of one of the two or more motion sensors having a higher priority;
   a control module operable to send a control signal to the actuator according to the target region where the motion is detected, and control the image capture device to aim at the target region using the actuator according to the control signal; and
   an image capture module operable to capture real-time images of the target region using the image capture device, and store the captured images in the storage system.

5. The monitoring station according to claim 4, wherein the image capture module further operable to display the captured images on the display screen.

6. The monitoring station according to claim 4, wherein each of the motion sensors includes one or more passive infrared (PIR) sensors, sound sensors, or dual-technology devices that comprise both a PIR sensor and a sound sensor.

7. A non-transitory storage medium storing a set of instructions, the set of instructions capable of being executed by a processor of an monitoring station to perform a surveillance method, the monitoring station in electronic communication with an actuator, an image capture device, and a plurality of motion sensors, the method comprising:
   detecting presence of motion in a monitored area in real-time using the motion sensors;
   determining a target region in the monitored area where the motion is detected according to which of the motion sensors detects the motion when the motion is detected, the motion sensors prioritized according to a predetermined importance of each motion sensor and each of the motion sensors being located to cover a target region in the monitored area; when two or more of the motion sensors simultaneously detect motion, the target region determined according to a covered target region of one of the two or more motion sensors having a higher priority;

sending a control signal to the actuator according to the target region where the motion is detected;

controlling the image capture device to aim at the target region using the actuator according to the control signal;

capturing real-time images of the target region using the image capture device; and storing the captured images in a storage system of the monitoring station.

8. The storage medium as claimed in claim 7, wherein the method further comprises:

displaying the captured images on a display screen of the monitoring station.

9. The storage medium as claimed in claim 7, wherein each of the motion sensors includes one or more passive infrared (PIR) sensors, sound sensors, or dual-technology devices that comprise both a PIR sensor and a sound sensor.

\* \* \* \* \*